United States Patent
Phelan et al.

(10) Patent No.: US 10,296,396 B2
(45) Date of Patent: May 21, 2019

(54) ALLOCATION OF JOB PROCESSES TO HOST COMPUTING SYSTEMS BASED ON ACCOMMODATION DATA

(71) Applicant: Bluedata Software, Inc., Mountain View, CA (US)

(72) Inventors: Thomas A. Phelan, San Francisco, CA (US); Michael J. Moretti, Saratoga, CA (US); Joel Baxter, San Carlos, CA (US); Gunaseelan Lakshminarayanan, Cupertino, CA (US); Kumar Sreekanti, Pleasanton, CA (US)

(73) Assignee: Bluedata Software, Inc., Santa Clara, CA (US)

( * ) Notice: Subject to any disclaimer, the term of this patent is extended or adjusted under 35 U.S.C. 154(b) by 96 days.

(21) Appl. No.: 14/708,519

(22) Filed: May 11, 2015

(65) Prior Publication Data

US 2016/0335128 A1    Nov. 17, 2016

(51) Int. Cl.
*G06F 9/50* (2006.01)
*G06F 9/46* (2006.01)

(52) U.S. Cl.
CPC .............. *G06F 9/5077* (2013.01); *G06F 9/46* (2013.01)

(58) Field of Classification Search
None
See application file for complete search history.

(56) References Cited

U.S. PATENT DOCUMENTS

| | | | | |
|---|---|---|---|---|
| 7,340,522 B1* | 3/2008 | Basu | ..................... | G06F 9/5033 709/217 |
| 2012/0179824 A1* | 7/2012 | Jackson | ................ | G06F 9/5027 709/226 |
| 2013/0086593 A1* | 4/2013 | Sloma | ..................... | G06F 9/505 718/105 |
| 2015/0074672 A1* | 3/2015 | Yeddanapudi | .......... | H04L 47/11 718/103 |
| 2015/0220370 A1* | 8/2015 | Ujibashi | ............... | G06F 9/5088 718/104 |
| 2016/0170787 A1* | 6/2016 | DeCusatis | ........... | G06F 9/45558 718/1 |

* cited by examiner

*Primary Examiner* — Wynuel S Aquino

(57) ABSTRACT

Systems, methods, and software described herein facilitate the allocation of large scale processing jobs to host computing systems. In one example, a method of allocating job processes to a plurality of host computing systems in a large scale processing environment includes identifying a job process for the large scale processing environment, and obtaining accommodation data for a plurality of host computing systems in the large scale processing environment. The method further provides identifying a host computing system in the plurality of host computing systems for the job process based on the accommodation data, and initiating a virtual node on the host computing system for the job process.

20 Claims, 8 Drawing Sheets

| DATA STRUCTURE 400 | | | |
|---|---|---|---|
| HOST COMPUTING SYSTEMS 410 | ACCOMMODATION INFORMATION 420 | ACCOMMODATION INFORMATION 421 | PERFORMANCE SCORES 440 |
| SYSTEM 411 | INFO 431 | INFO 435 | SCORE 441 |
| SYSTEM 412 | INFO 432 | INFO 436 | SCORE 442 |
| SYSTEM 413 | INFO 433 | INFO 437 | SCORE 443 |
| .... | .... | .... | .... |
| SYSTEM 414 | INFO 434 | INFO 438 | SCORE 444 |

FIGURE 4

ALLOCATION OF JOB PROCESSES TO HOST COMPUTING SYSTEMS BASED ON ACCOMMODATION DATA

TECHNICAL FIELD

Aspects of the disclosure are related to computing hardware and software technology, and in particular to the allocation of job processes to host computing systems.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various applications and frameworks have been developed to interact with such large data sets, including Hive, HBase, Hadoop, Amazon S3, and CloudStore, among others.

At the same time, virtualization techniques have gained popularity and are now commonplace in data centers and other computing environments in which it is useful to increase the efficiency with which computing resources are used. In a virtualized environment, one or more virtual machines are instantiated on an underlying host computer and share the resources of the underlying computer. Accordingly, rather than implementing a single node per host computing system, multiple nodes may be deployed on a host to more efficiently use the processing resources of the computing system.

In some implementations, virtual data processing nodes on host computing systems may operate independent of the required data storage repositories. Accordingly, any of the processing nodes within the environment may be used to process data from any of the storage repositories within the system. However, as the environments become more complex with more computing systems and data storage locations, inefficiencies may arise in the allocation of virtual nodes and job processes to the host computing systems.

OVERVIEW

The technology disclosed herein enhances how large scale processing jobs are allocated to host computing systems in a computing environment. In one example, an administration system identifies a job process to be implemented in a large scale processing environment (LSPE). In response to identifying the job process, the administration system obtains accommodation data for host computing systems in the large scale processing environment (LSPE), and identifies a host computing system in the host computing systems for the job process based on the accommodation data. Once identified, the administration system initiates a virtual node on the host computing system for the job process.

In some implementations, the accommodation data may include host computing system attributes related to the physical and software configurations of the host computing systems, and data access attributes between the host computing systems and a storage repository associated with the job process.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a data structure for identifying a host computing system to allocate a virtual node based on accommodation data.

TECHNICAL DISCLOSURE

Large scale processing environments (LSPEs) may employ a plurality of physical computing systems to provide efficient processing of jobs across a plurality of virtual nodes. These virtual nodes may include full operating system virtual machines, Linux containers, jails, or other similar types of virtual containment nodes. In addition to the virtual processing nodes, data sources are made available to the virtual processing nodes that may be stored on the same physical computing systems or on separate physical computing systems and devices. These data sources may be stored using Hadoop distributed file system (HDFS), versions of the Google file system, versions of the Gluster file system (GlusterFS), or any other distributed file system version—including combinations thereof.

To efficiently assign job processes, such as Apache Hadoop processes, Apache Spark processes, Disco processes, or other similar job processes to the host computing systems within a LSPE, accommodation data may be monitored for each of the host systems. This accommodation data may include host system attributes and data access attributes for each of the host computing systems. The host system attributes comprise physical and software configurations for each of the host systems, including the availability of cache memory to accommodate a new job process, the availability of processors to accommodate a new job process, the backplane characteristics to accommodate the retrieval of data for the new job processes, and other similar characteristics of the host systems. Further, the data access attributes for each host system are related to the accessibility of data from storage repositories associated with the new job process. For example, a new job process may require data from a HDFS storage repository. Accordingly, data access attributes, such as bandwidth attributes, physical proximity attributes, or ping attributes may be determined for each host system in relation to the required HDFS storage repository.

In at least one example, an administration node identifies a new job process to be implemented within a LSPE. In response to identifying the new job process, the administration node obtains accommodation data for each host within the LSPE, and identifies a host for the job process based on the accommodation data. Once a host is identified, the administration node may initiate a virtual node on the host system for the job process. In some implementations, a new virtual node may be initiated, however, in other examples, a virtual node that is idle on the host system may be allocated to the new job process.

Figure 1:
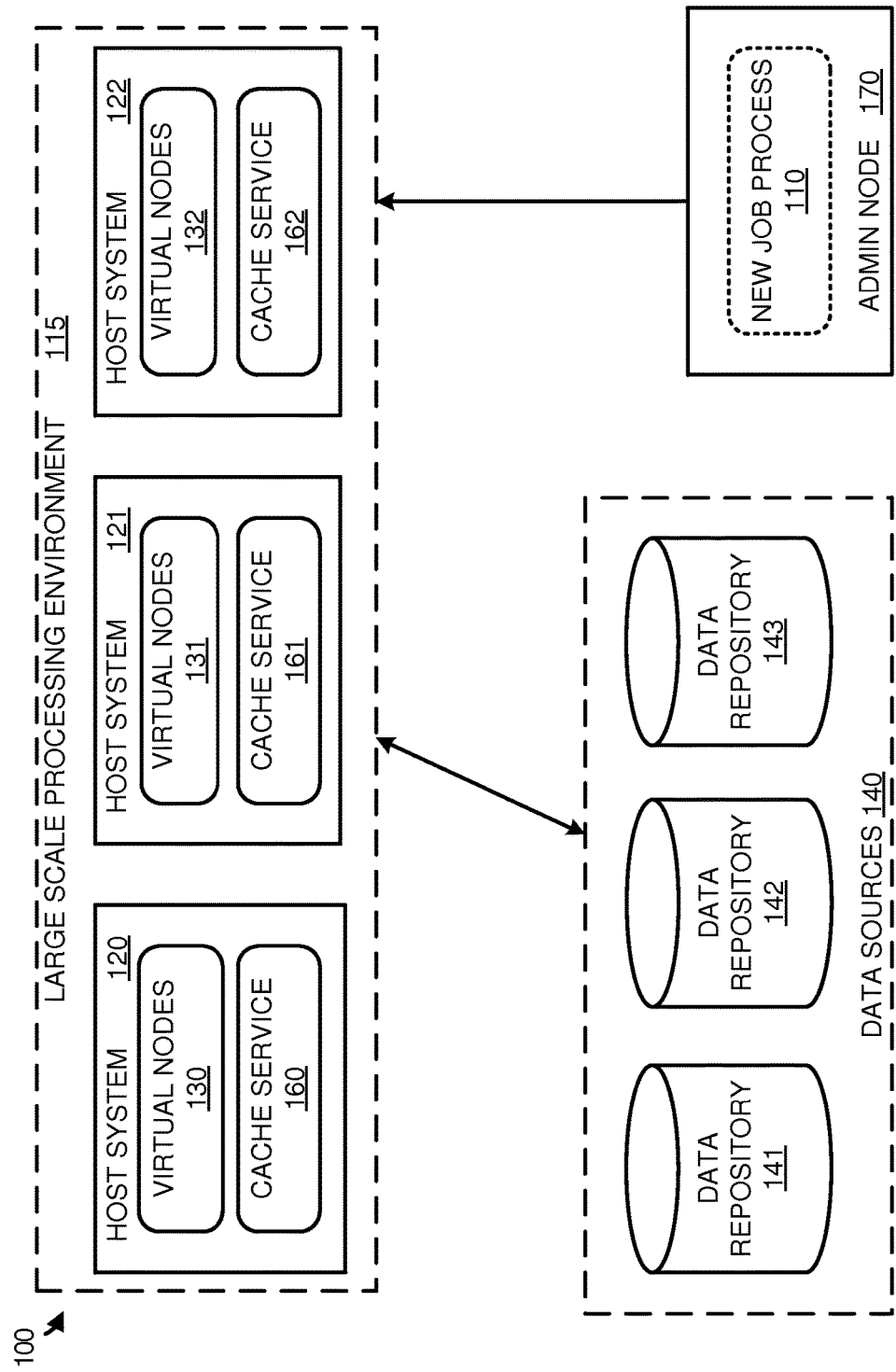
FIG. 1 illustrates a system to allocate virtual nodes based on accommodation data for host computing systems.

Referring now to FIG. 1, FIG. 1 illustrates a system 100 to allocate virtual nodes based on accommodation data for host computing systems. System 100 includes large scale processing environment (LSPE) 115, data sources 140, and administration (admin) node 170. LSPE 115 further includes host systems 120-122, which further comprise virtual nodes 130-132 and cache services 160-162. Virtual nodes 130-132 may comprise full operating system virtual machines, Linux containers, jails, or other types of virtual containment nodes. Data sources 140 further includes data repositories 141-143, which are representative of any repository stored in HDFS, Google File System, GlusterFS, or some other similar large scale processing file system or object storage.

In operation, an administrator, user, or automated service may generate a new job process 110 to be executed via one or more virtual nodes in LSPE 115. A job process, such as new job process 110, may be distributed across one or more of the virtual nodes, and retrieve data, via cache services 160-162, from data sources 140 for processing. Cache services 160-162 comprise processes that act as an interface between the virtual nodes and the data repositories. For example, a virtual node on host system 120 may request one or more data items from data sources 140. In response to the request, cache service 160 may identify the request, and retrieve the requested data from data sources 140 for processing by the virtual node. Although illustrated separately in the present example, it should be understood that data repositories 141-143 may reside wholly or partially on host systems 120-122.

In the present example, to allocate new job process 110 within LSPE 115, administration node 170 is provided. Administration node 170 executes an allocation process to determine the appropriate host system of host systems 120-122 for new job process 110. In particular, administration node 170 may obtain accommodation information for each of host systems 120-122, and determine the appropriate host system for new job process 110 based on the accommodation information.

Figure 2:
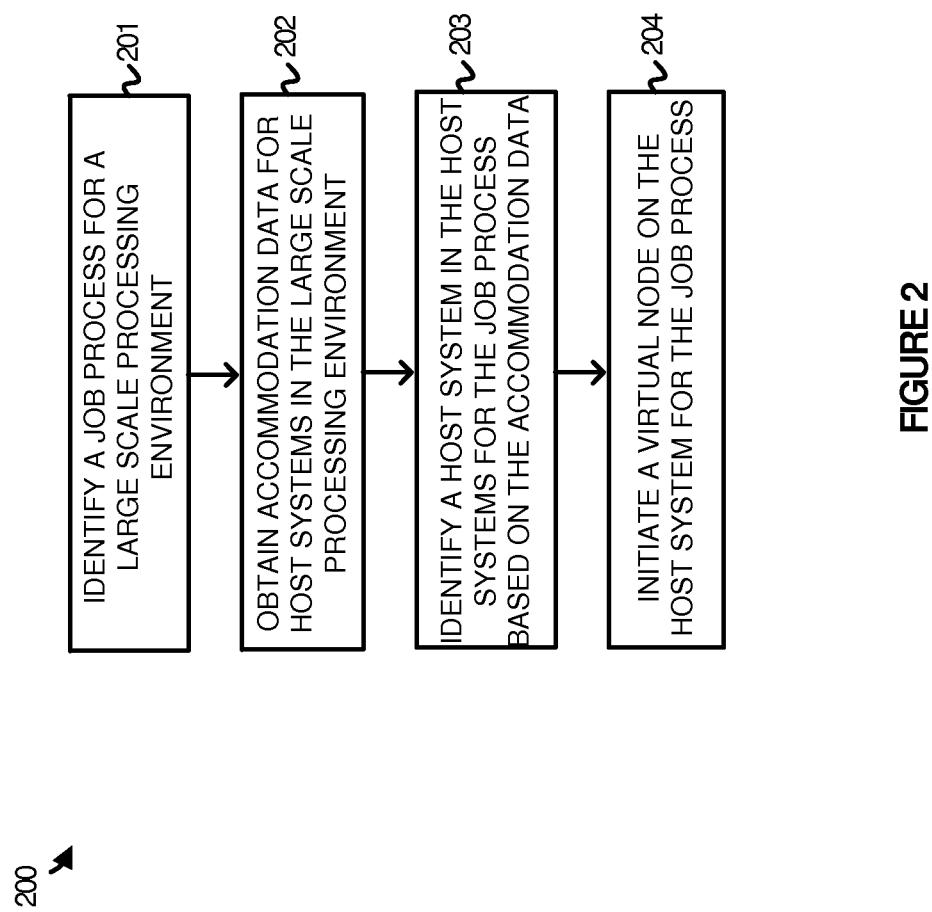
FIG. 2 illustrates a method of operating an administration node to allocate a virtual node based on accommodation data for host computing systems.

To further demonstrate the operation of administration node 170, FIG. 2 is provided. FIG. 2 illustrates a method 200 of operating administration node 170 to allocate a virtual node for a job process based on accommodation data for host systems 120-122. The operations of FIG. 2 are referenced parenthetically below.

In FIG. 2, administration node 170 identifies new job process 110 for LSPE 115 (201). This job process may be generated by an administrator or user at administration system 170, may be generated by a user or administrator by a remote console communicatively coupled to administration node 170, or may be generated by an automated process. New job process 110 may comprise a Hadoop job process, a Spark job process, a High Performance Computing Cluster (HPCC) job process, a Disco job process, or some other job process.

Once the job process is identified, administration node 170 obtains accommodation data for host systems 120-122 in the LSPE (202). To obtain the accommodation data for host systems 120-122, administration node 170 may receive at least a portion of the data from host systems 120-122, but may also supplement the received data with information stored in one or more data structures that are accessible by administration node 170. In some implementations, the accommodation data for host systems 120-122 may include host system attributes and data access attributes. The host system attributes may include cache availability attributes for the job process, processing availability attributes for the job process, backplane attributes for the job process, the number of virtual nodes executing on the host systems, the dynamic random access memory (DRAM) or disk speed of the host systems, or other physical and software related attributes to the host systems. The data access attributes, in contrast, comprise information specific to the data repository required for the job process. This information may include bandwidth information between the hosts and the data repository, the physical proximity of the hosts and the data repository, ping information between the hosts and the data repository, or any other similar data retrieval information.

Once the accommodation data is obtained, administration node 170 identifies a host system in host systems 120-122 to execute a virtual node for new job process 110 based on the data retrieval information (203). In at least one example, to identify the host system for the job process, administration node 170 may calculate a score for each host based on the accommodation data and a predefined algorithm. Once the scores are calculated for each host, a host may be identified for the new job process based on the scores.

In some implementations, new job process 110 may be associated with a minimum quality of service. Accordingly, to select a host system in host systems 120-122, administration node 170 may identify a host that provides at least the minimum quality of service. For example, new job process 110 may require a minimum amount of cache memory for execution on a particular host. Consequently, if one of the hosts cannot provide the adequate amount of memory that host may not be selected for the job process. Although illustrated in the previous example as using a single accommodation parameter for the quality of service determination, it should be understood that any number of the accommodation parameters might be used for the quality of service. Further, in some instances, it should be understood that the new job process may be associated with a minimum accommodation score, which can be compared to scores generated for each of the host systems.

Once the host system is identified, administration node 170 may initiate the virtual node on the host system for job process 110 (204). In some examples, to initiate the virtual node, administration node 170 may initiate a new virtual node on the host computing system. In other examples, administration node 170 may allocate the job process to an idle virtual node already executing on the host computing system. As an illustrative example, administration node 170 may identify host system 120 for new job process 110 based on the retrieved accommodation data. Responsive to the determination, administration node 170 assigns new job process 110 to host system 120 and initiates execution of the job process on the host.

Although described in the previous example as assigning the job process to a single virtual node, it should be understood that a job process might be assigned to multiple nodes. Thus, rather than allocating a single node on a host computing system, the accommodation data may be used to identify one or more host systems for the required plurality of nodes.

Figure 3:
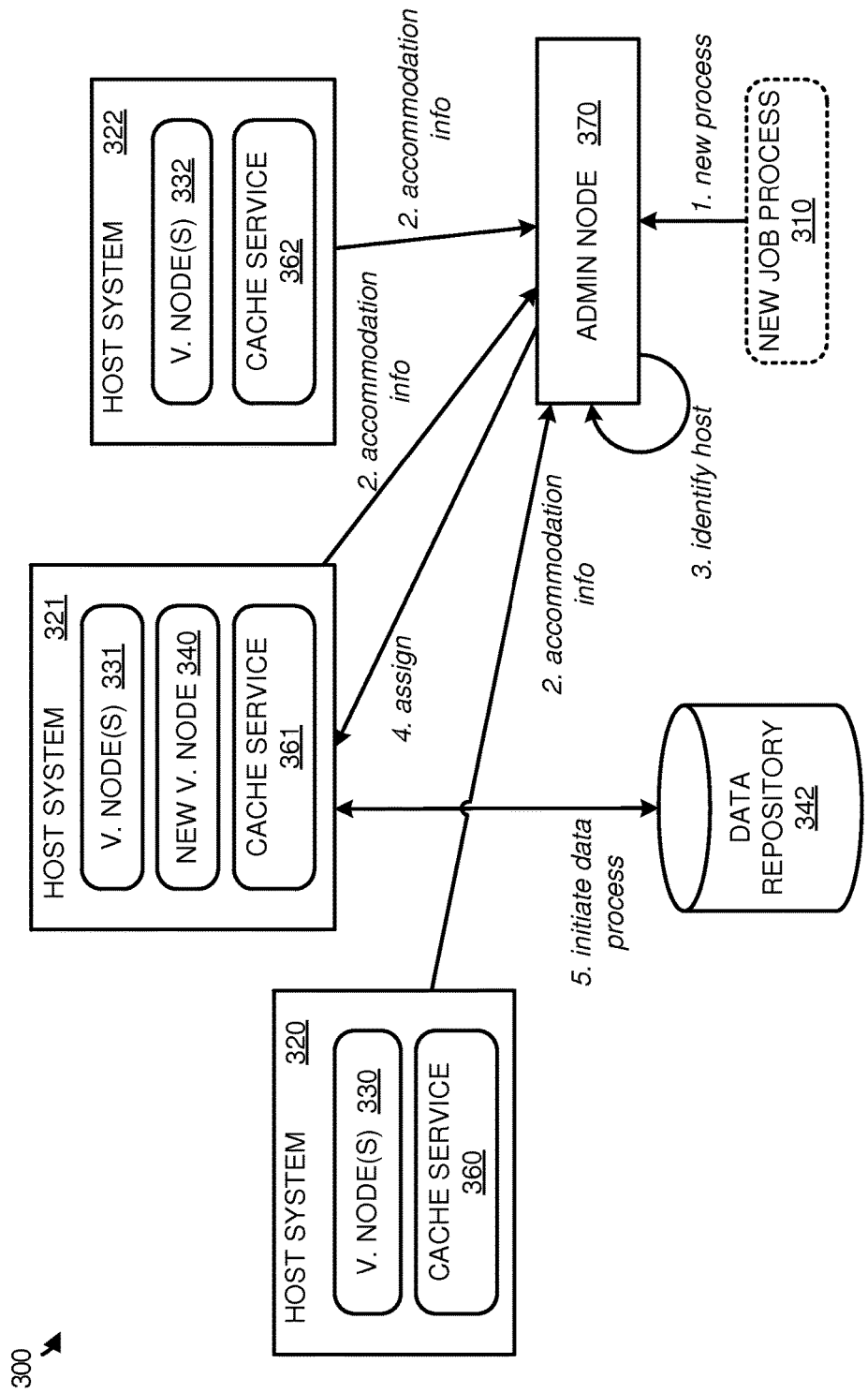
FIG. 3 illustrates an overview of allocating a virtual node based on accommodation data for host computing systems.

Referring now to FIG. 3, FIG. 3 illustrates an overview 300 allocating a virtual node based on accommodation data for host computing systems. Overview 300 includes host systems 320-322, data repository 342, and administration node 370. Host systems 320-322 further include virtual nodes (v. nodes) 330-332, and cache service 360-362.

In operation, host systems 320-322 provide a platform to execute virtual nodes 330-332. Virtual nodes 330-332 operate independently on each of the host systems allowing the hardware of each of the host systems to be more efficiently distributed to each of the processing jobs. To allocate the processing jobs to host systems 320-322, administration node 370 is provided. Administration node 370 may comprise a computing system, or may comprise a virtual node capable of communicating with each host system in a computing environment.

Here, administration node 370 identifies new job process 310 to be added to the computing environment represented by host systems 320-322. This new job process may be defined by an administrator of the computing environment, a user in the computing environment, or by an automated process associated with the computing environment. In response to the request to add the new job process, administration node 370 obtains accommodation information for each host system of host systems 320-322. This accommodation information includes host system attributes related to the physical and software configurations for host systems 320-322, and further includes data access attributes related to the accessibility of data repository 342.

In particular, host systems 320-322 may determine host system attributes, such as the amount of cache memory available for a new process, the processing capabilities available to a new job process, backplane characteristics for the job process, or any other similar software or hardware information. Further, host systems 320-322 may report information based on the accessibility of data repository 342. This accessibility information may include the amount of bandwidth to access data repository 342, the physical proximity between each of the hosts and the data repository, the ping time between the hosts and the data repository, or any other similar information.

Once the accommodation information is determined, administration node 370 identifies a host to allocate a new virtual node based on the accommodation information. In some instances, administration node 370 may be configured to implement a preconfigured algorithm to determine the appropriate host for a new job process. For example, the algorithm may rate or score the accommodation information for each of the host computing systems to determine the best host for allocating the new job process. Once host system is identified via the algorithm, administration node 370 may allocate new job process 310 to the identified host system. In the present example, administration node 370 identifies host system 321 to handle new job process 310, and initiates new virtual node 340 for the job process. Upon initiation, new virtual node 340 executes and retrieves data from data repository 342 to provide a desired response to the query presented in new job process 310.

In some examples, such as the example illustrated in FIG. 3, cache services 360-362 may be used as the interface between the virtual processing nodes and the necessary data. For example, a virtual node on a host computing system may request a particular portion of data, and the cache service will retrieve the data and place the data within a portion of memory accessible by the requesting virtual node. The cache services may also assist in identifying accommodation information for each of the hosts by identifying the amount of cache memory that remains available to a new job process, as well as measuring data retrieval information to the various repositories.

Although illustrated in the present example as receiving the accommodation information after identifying new job process 310, it should be understood that the accommodation information might be retrieved periodically from the hosts in the computing system. For example, host systems 320-322 may maintain accommodation information and periodically report the information to administration node 370. Further, in some implementations, administration node 370 may maintain and have access to one or more data structures for the accommodation information. For example, administration node 370 may maintain information about the number of job processes executing on each of the hosts, the amount of cache memory that each of the job processes requires, the amount of processing resources that each of the job processes requires, or any other similar information. Thus, rather than gathering the information directly from the host systems, the administration node may rely, at least partially, on information that is maintained locally.

To further demonstrate the operation of the administration node within the computing environment, FIG. 4 is provided. FIG. 4 illustrates a data structure 400 for identifying a host computing system to allocate a virtual node based on accommodation information for host computing systems. Data structure 400 includes host computing systems 410, accommodation information 420-421, and performance scores 440. Host computing systems 410 comprises systems 411-414, accommodation information 420-421 comprises information 431-438, and performance scores 440 comprises scores 441-444. Although illustrated with two accommodation information fields, it should be understood that the accommodation information for each of the host computing systems might include any number of fields.

As described herein, host computing systems within a LSPE may execute a plurality of virtual nodes to more efficiently use the computing resources of the physical computing devices. These virtual nodes may be segregated form the data that they attempt to process, allowing each of the virtual nodes and the corresponding hosts to access any data repository designated for processing within the environment. These data repositories may include any repository stored in HDFS, Google File System, GlusterFS, or some other similar large scale processing file system or object storage.

As illustrated herein, because each of the hosts is provided access to each of the available data repositories, a new job process may be assigned to any of the available hosts. To determine which host should be assigned the job process, an administration node may maintain and collect accommodation data for each host computing system in the environment. This accommodation information for each computing system includes the current software and hardware states for each of the host computing systems, and may further include information about the data accessibility to the data storage repository required by the particular job process. This data accessibility information may include the proximity of the host to the data repository, the amount of bandwidth available on the host to retrieve data, the ping time between the repository and the host, or other similar retrieval information specific to the host and the repository.

Once the accommodation data is obtained for the host systems, the advisement system may determine a performance score for each of the hosts for the job process. Here, to illustrate the generation of the performance scores data structure 400 is provided. In the present example, data structure 400 includes host computing systems 410, which correspond to identifiers for each of the hosts in the LSPE, accommodation information 420-421, and performance scores 440 for each of the host systems. Accommodation information 420-421 may comprise any of the accommodation data described herein, which may be retrieved from the hosts or from local data structures configured to manage accommodation data for the administration node. Once accommodation information 420-421 is defined, performance scores 440 may be determined for each of the host computing systems. In some examples, to determine the performance scores, the administration node may include a predefined algorithm to compare the one or more accommodation information fields and generate a performance relationship between the host computing systems. Once the scores are determined, the administration system may select a host computing system based on the scores and initiate a virtual node on the identified host.

In some implementations, the virtual node may be initiated on the virtual machine with the best performance score from the obtained accommodation data. However, in other instances, a minimum quality of service performance score may be defined for the job process. Based on the minimum quality of service, any host that fails to meet the minimum quality of service will not be assigned a job, whereas any host that meets the required quality of service may be assigned the new processing node.

Although illustrated in the present example as a table data structure to identify the appropriate host system, it should be understood that any other form of data structure or method may be used to compile and determine scores for each of the host computing systems. These data structures may include arrays, linked lists, or any other type of data structure. While demonstrated in the present instance with four systems 411-414, it should be understood that LSPEs might include any number of host computing systems.

Figure 5:
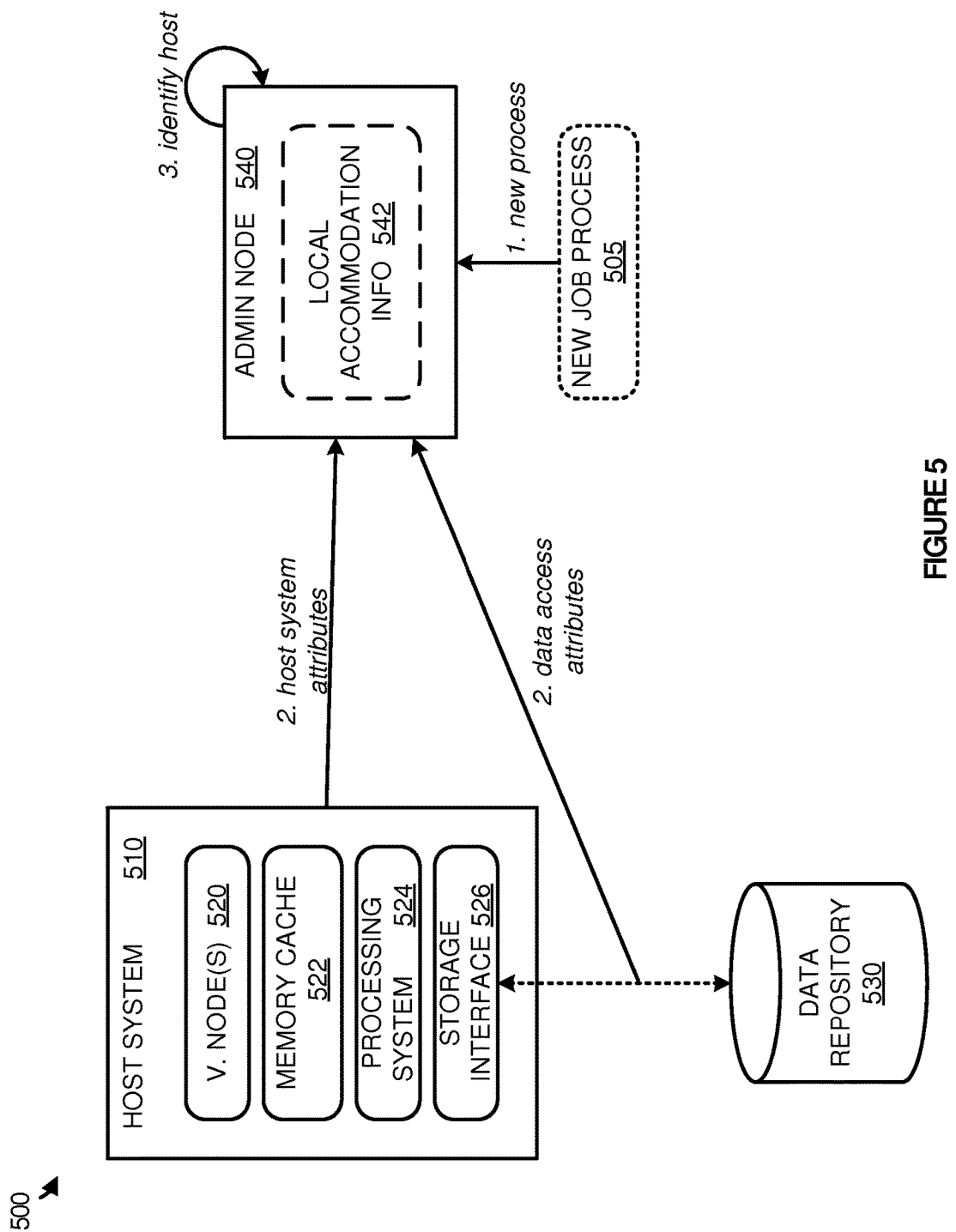
FIG. 5 illustrates an overview of identifying a host computing system for a virtual node based on host system attributes and data access attributes.

FIG. 5 illustrates an overview 500 of identifying a host computing system for a virtual node based on host system attributes and data access attributes. Overview 500 includes host system 510, data repository 530, and administration (admin) node 540. Host system 510 further includes virtual nodes (v. nodes) 520, memory cache 522, processing system 524, and storage interface 526. Administration node 540 further includes local accommodation information (info) 542.

As illustrated, new job process 505 is generated to be implemented within a LSPE. New job process 505 may be generated by an administrator of the LSPE, a user with access to the LSPE, an automated process, or some other party with the ability to generate a job process for the LSPE. In response to identifying the LSPE, administration node 540 obtains accommodation data for each host within the LSPE. Here, as an illustrative example, administration node 540 retrieves host system attributes and data access attributes for host system 510, although any number of other host systems may be included within the environment. In addition to or in place of retrieving the accommodation data from the host system, administration node 540 may use information stored within local accommodation information 542 to determine the accommodation information for the host systems.

In particular, host system attributes may include information about the number of virtual nodes 520 executing on host system 510, the amount of memory cache 522 available on host system 520, the amount of processing available on processing system 524, or any other similar information about host system 510. Data access attributes, in contrast, may be specific to the data repository associated with new job processes 505. For example, new job process 505 requires data repository 530 for operation. Accordingly, data access attributes may be determined, such as the bandwidth or bitrate between host system 510 and data repository 530, the physical proximity of host system 510 to data repository 530, the ping time between host system 510 and data repository 530, or any other similar data access attribute.

Once the accommodation information is obtained for each of the hosts within the LSPE, administration node 540 may identify a host to support a virtual node for new job processes 505. In some implementations, administration node 540 may determine an aggregate score for each host within the LSPE, and based on the scores determine a host system to support new job process 505. In some examples, new job process 505 may include a required or minimum quality of service. Accordingly, if any of the hosts within the LSPE are incapable of providing the necessary quality of service, those hosts will not be assigned a new virtual node. For example, if new job process 505 required a predefined amount of cache memory, and host system 510 did not include the requisite amount of cache memory, administration node 540 will not assign a new virtual node to host system 510.

Figure 6:
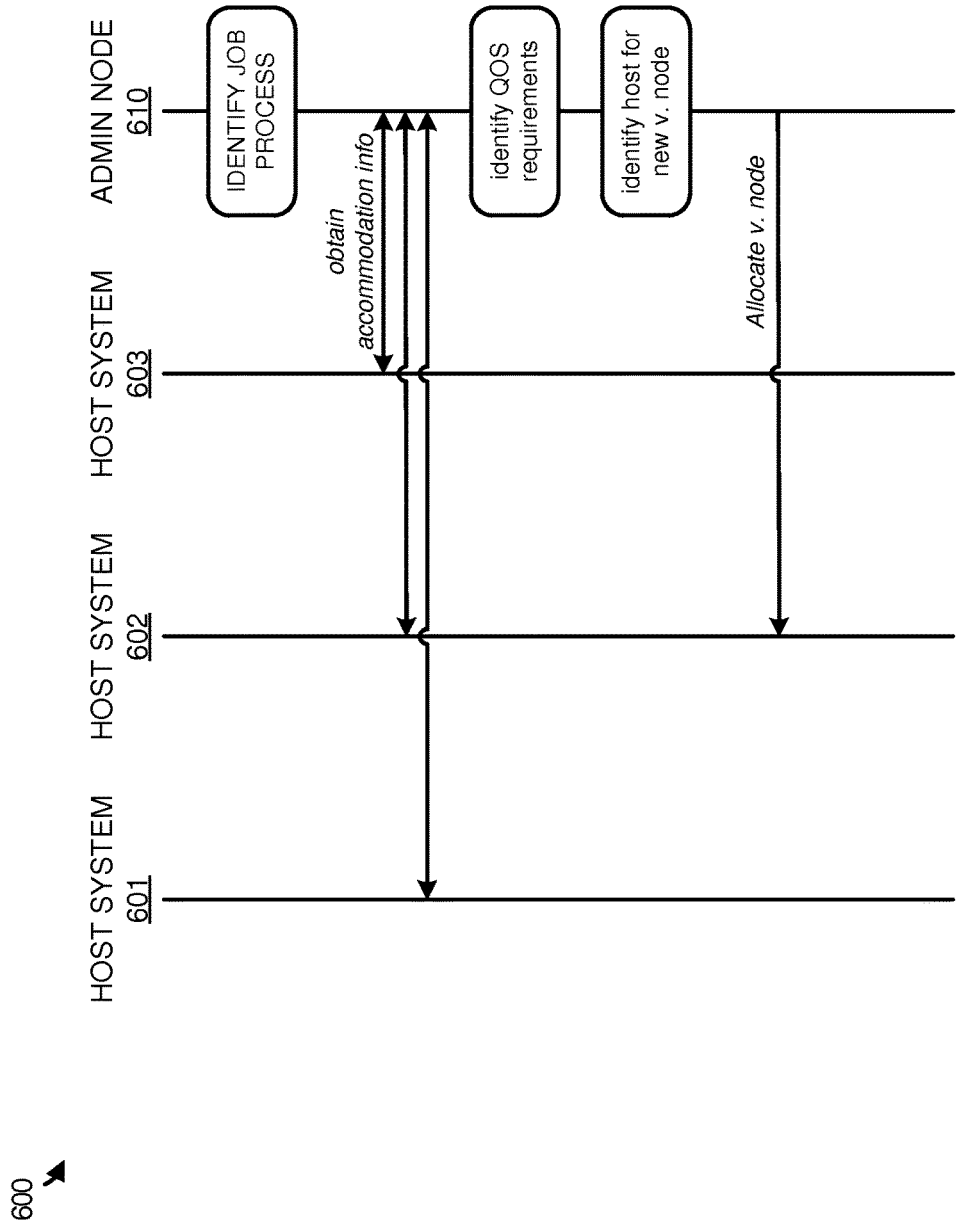
FIG. 6 illustrates a timing diagram to allocate virtual nodes based on accommodation data for host computing systems.

Turning to FIG. 6, FIG. 6 illustrates a timing diagram 600 to allocate virtual nodes based on accommodation data for host computing systems. Timing diagram 600 includes host systems 601-603 that are representative of a LSPE environment, and further includes administration (admin) node 610 that distributes job processes to host systems 601-603.

As depicted, administration node 610 identifies a new job process to be executed within the LSPE. In response to the job process request, administration node 610 obtains accommodation data for host systems 601-603. In some implementations, the data may be obtained by receiving the data from host systems 601-603 periodically or upon request from administration node 610. However, in addition to or in place of receiving the information from host systems 601-603, the information may be obtained from one or more data structures accessible to administration node 610. The accommodation information may include host system attributes that relate to the configuration of the individual host systems, such as the memory or the processing power available on the individual host systems to support a new processing job, and may further include data access attributes that relate the data accessibility between each host and the required data repository for the job process.

Once the accommodation information is determined, administration node 610 determines an appropriate host to allocate a virtual node for the new job process accommodation information. Here, administration node 610 first identifies quality of service requirements for the job process that can be used to eliminate host systems that fail to provide a required quality of service for the job process. For example, the new job process may require a particular amount of cache memory or processing cores for the desired task. As a result if one of the host systems is incapable of providing the adequate quality of service, the host will not be considered for allocating the job process. Once host systems are eliminated based on their available resources, administration node 610 may determine a host system based on the accommodation information for the other host systems.

In some implementations, administration node 610 may apply one or more algorithms to compare the accommodation information for each of the hosts. Once scores are generated from the algorithms, administration node 610 may determine a host for the new job process. As illustrated in FIG. 6, the accommodation information identifies that host system 602 is capable of processing the new job process, and a new virtual node is allocated on host system 602 to accommodate the new job process.

Figure 7:
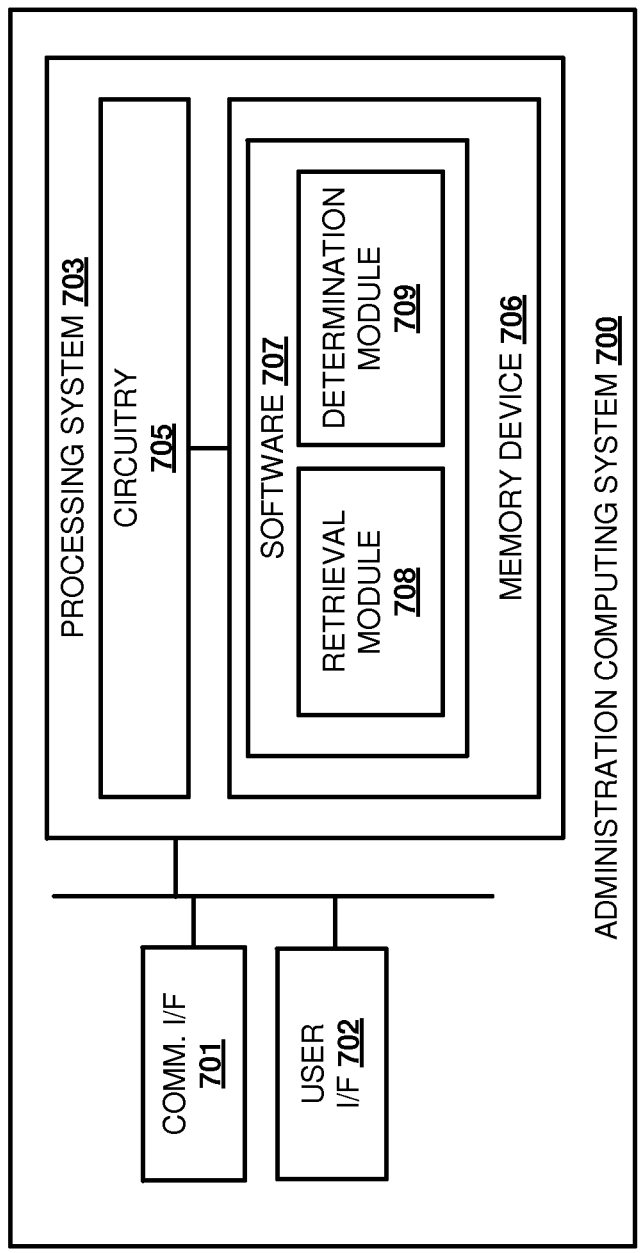
FIG. 7 illustrates an administration computing system to allocate a virtual node based on data retrieval information from host computing systems.

Referring to FIG. 7, FIG. 7 illustrates an administration computing system 700 that is representative of any computing system or systems with which the various operational architectures, processes, scenarios, and sequences disclosed herein for a LSPE administration node may be implemented. Computing system 700 is an example of administration nodes 170, 370, 540, and 610, although other examples may exist. Administration computing system 700 comprises communication interface 701, user interface 702, and processing system 703. Processing system 703 is linked to communication interface 701 and user interface 702. Processing system 703 includes processing circuitry 705 and memory device 706 that stores operating software 707. Administration computing system 700 may include other well-known components such as a battery and enclosure that are not shown for clarity. Computing system 700 may be a personal computer, server, or some other computing apparatus—including combinations thereof.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with a plurality of host systems that together implement a LSPE described herein.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes retrieval module 708 and determination module 709, although any number of software modules may provide the same operation. Operating software 707 may further include an operating system, utilities, drivers, network interfaces, applications, or some other type of software. When executed by processing circuitry 705, operating software 707 directs processing system 703 to operate administration computing system 700 as described herein.

In particular, operating software 707 directs processing system 703 to identify a job process for a LSPE. Retrieval module 708 directs processing system 703 to obtain accommodation information for host systems in the LSPE, which may include host system information and data access information for each of the hosts. Determination module 709 directs processing system 703 to identify a host system in the host systems to execute a virtual node for the job process based on the accommodation information, and initiate the virtual node on the host system for the job process. In some examples, the initiation of the virtual node may include starting a new virtual node on the host computing system, however, in other examples it may include allocating the job process to an idle virtual node on the computing system.

In some implementations, host system information retrieved for each of the hosts may include information about the number of virtual nodes executing on each host, the amount of cache memory available on each host, the amount of processing cores available on each host, or any other information specific to the individual host. The data access information, in contrast, comprises information about the data accessibility between each host and the required data repository. For example, a job process may require a HDFS repository for operation. As a result, administration computing system 700 may determine information, such as the bandwidth between each host and the HDFS repository, the ping time between the host and the HDFS repository, the physical proximity between the host and the HDFS repository, or any other similar information. Once the accommodation information is gathered for each of the hosts, administration computing system 700 may compile the information and determine a proper host for the job process based on the compiled information.

Figure 8:
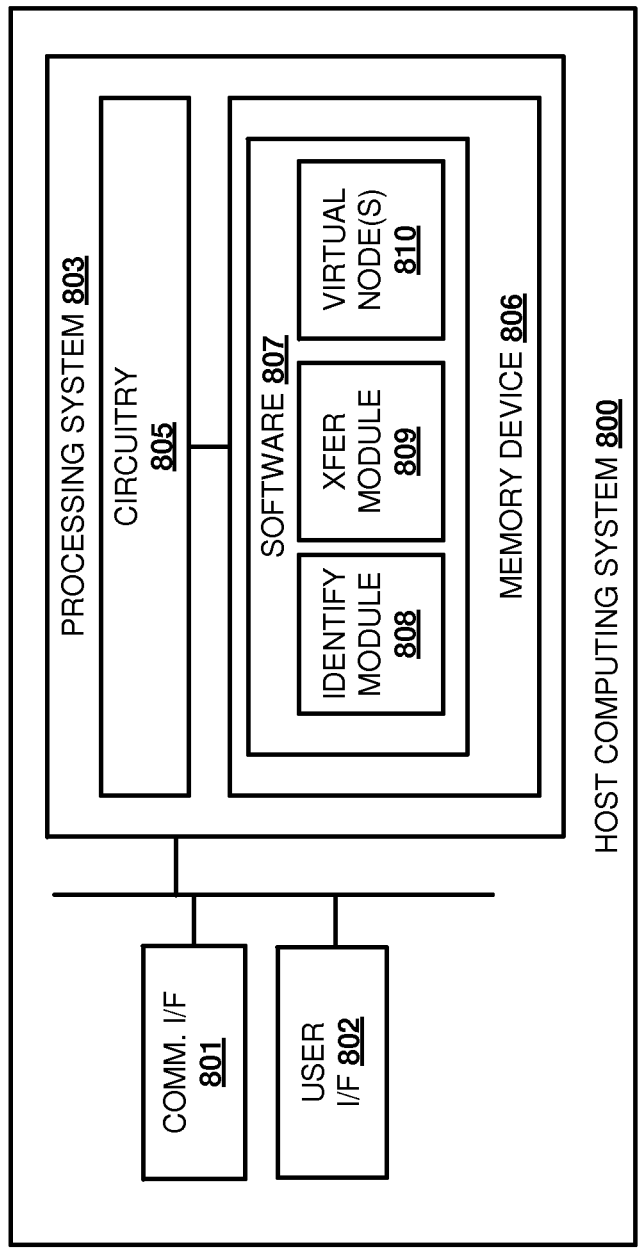
FIG. 8 illustrates a host computing system in a large scale processing environment.

Turning to FIG. 8, FIG. 8 illustrates host computing system 800 that is representative of any host computing system in FIGS. 1-6, although other examples may exist. Host computing system 800 comprises communication interface 801, user interface 802, and processing system 803. Processing system 803 is linked to communication interface 801 and user interface 802. Processing system 803 includes processing circuitry 805 and memory device 806 that stores operating software 807. Host computing system 800 may include other well-known components such as a battery and enclosure that are not shown for clarity. Computing system 800 may be a personal computer, server, or some other computing apparatus—including combinations thereof.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In some implementations, communication interface 801 may be configured to communicate with an administration system, such as administration system 700, and may further communicate with one or more other computing systems responsible for storing the processing data.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes identify module 808 and transfer module 809, although any number of software modules may provide the same operation. Operating software 807 further includes virtual nodes 810 used to execute large scale processing jobs, and may further include an operating system, utilities, drivers, network interfaces, applications, or some other type of software. When executed by processing circuitry 805, operating software 807 directs processing system 803 to operate host computing system 800 as described herein.

In particular, operating software 807 directs processing system 803 to provide accommodation data to an administration system to allow the administration system to allocate a job process. Identify module 808 directs processing system 803 to identify accommodation information related to the physical and software status of host computing system 800, and may further identify data accessibility information between host computing system 800 and a required storage repository for a job process. Specifically, the physical and software status of host computing system 800 may include information about the cache memory available, the speed of the cache memory available, the amount of processing available for the new job process, the number of other virtual nodes already executing on the host, backplane characteristics of the host, or other similar information related to the physical and software configuration. The data accessibility information may include the amount of bandwidth available to retrieve the required data, the ping time between the host and the data repository, the physical proximity between the host and the data repository, or any other similar information.

In some implementations, transfer module 809 directs processing system 803 to transfer the accommodation information to the administration node on request from the administration node, but may also provide the accommodation information periodically to the administration node. Further, although illustrated in the present example as providing all of the accommodation information to administration node, it should be understood that the administration node may manage at least a portion of the accommodation information. For example, the administration node may maintain information on the amount of cache memory available for each of the host systems, the number of virtual nodes that have been initiated on the host systems, or any other similar information.

Returning to the elements of FIG. 1, host systems 120-122, administration node 170, and data repositories 141-143 may each include communication interfaces, network interfaces, processing systems, computer systems, microprocessors, storage systems, storage media, or some other processing devices or software systems, and can be distributed among multiple devices. Host systems 120-122 and data repositories 141-143 may comprise server computers, desktop computers, laptop computers, or any other similar computing system, including combinations thereof. Although illustrated separate in the present example, it should be understood that data repositories 141-143 may be stored on the same computing devices as host systems 120-122. Administration node 170 may comprise a server computer, a desktop computer, or other similar computing system, including virtual representations thereof. LSPE 115 may communicate with data sources 140 and administration node 170 via Time Division Multiplex (TDM), Internet Protocol (IP), Ethernet, optical networking, wireless protocols, communication signaling, or some other communication format—including combinations thereof.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus to allocate job processes to a plurality of host computing systems in a large scale processing environment, the apparatus comprising:
   a means for identifying a job process for the large scale processing environment; identify a data repository with data associated with the job process, wherein the data repository comprises a distributed repository stored on computing systems;
   a means for obtaining accommodation data from each host computing system in a plurality of host computing systems in the large scale processing environment, wherein the accommodation data comprises at least a quantity of virtual nodes executing on each of the host computing systems and at least data access attributes related to an accessibility of the data repository by each of the plurality of host computing systems, and wherein the data access attributes comprise at least bandwidth availability information for accessing the data repository by each of the plurality of host computing systems;
   a means for determining accommodation scores for each of the plurality of host computing systems based on the accommodation data;
   a means for identifying a host computing system in the plurality of host computing systems for the job process based on the accommodation scores; and
   a means for initiating a virtual node on the identified host computing system to execute the job process, wherein the job process retrieves data from the data repository.

2. The apparatus of claim 1 wherein the accommodation data further comprises host computing system attributes related to at least physical resource availability on each of the plurality of host computing systems for the job process.

3. The apparatus of claim 2 wherein the host computing system attributes comprise at least one of cache memory availability, processing availability, or backplane characteristics.

4. The apparatus of claim 1 wherein the data repository comprises a repository stored in a version of a Hadoop distributed file system (HDFS), a Google file system, or a Gluster file system (GlusterFS).

5. The apparatus of claim 1 wherein the data access attributes further comprise physical proximity information, or ping information related to the data repository for each host computing system in the plurality of host computing systems.

6. The apparatus of claim 1 wherein the processing instructions further direct the processing system to identify a minimum quality of service for the job process, and wherein the processing instructions to identify the host computing system in the plurality of host computing systems for the job process based on the accommodation data direct the processing system to identify the host computing system in the plurality of host computing systems based on the accommodation data and the minimum quality of service.

7. The apparatus of claim 1 wherein the virtual node for the job process comprises one of a virtual machine for the job process or a virtual container for the job process.

8. The apparatus of claim 1 wherein the job process comprises an Apache Hadoop job process, an Apache Spark process, or a Disco process.

9. A method of allocating job processes to a plurality of host computing systems in a large scale processing environment, the method comprising:
    identifying a job process for the large scale processing environment; identifying a data repository associated with the job process, wherein the data repository comprises a distributed repository stored on computing systems;
    obtaining accommodation data for the plurality of host computing systems in the large scale processing environment, wherein the accommodation data comprises at least a quantity of virtual nodes executing on each of the host computing systems, and wherein the accommodation data comprises at least bandwidth availability information for accessing the data repository by each of the plurality of host computing systems;
    a means for determining accommodation scores for each of the plurality of host computing systems based on the accommodation data:
    identifying a host computing system in the plurality of host computing systems for the job process based on the accommodation scores; and
    initiating a virtual node on the identified host computing system for the job process;
    executing, by the initiated virtual node, the job process by retrieving data from the data repository.

10. The method of claim 9 wherein the accommodation data further comprises host computing system attributes related to at least physical resource availability on each of the plurality of host computing systems for the job process.

11. The method of claim 10 wherein the host computing system attributes comprise at least one of cache memory availability, processing availability, or backplane characteristics.

12. The method of claim 9 wherein the data repository comprises a repository stored in a version of a Hadoop distributed file system (HDFS), a Google file system, or a Gluster file system (GlusterFS).

13. The method of claim 9 wherein the accommodation data further comprises at least one of bandwidth information, physical proximity information, or ping information related to accessing the data repository for each host computing system in the plurality of host computing systems.

14. The method of claim 9 further comprising identifying a minimum quality of service for the job process, and wherein identifying the host computing system in the plurality of host computing systems for the job process based on the accommodation data comprises identifying the host computing system in the plurality of host computing systems based on the accommodation data and the minimum quality of service.

15. The method of claim 9 wherein the virtual node for the job process comprises one of a virtual machine for the job process or a virtual container for the job process.

16. The method of claim 9 wherein the job process comprises an Apache Hadoop job process, an Apache Spark process, or a Disco process.

17. A system to allocate job processes amongst a plurality of host computing systems, the system comprising:
    one or more non-transitory computer readable storage media;
    a processing system operatively coupled to the one or more non-transitory computer readable storage media; and
    processing instructions stored on the one or more non-transitory computer readable storage media that, when executed by the processing system, direct the processing system to at least:
    identify a job process for the plurality of host computing systems; identify a data repository associated with the job process, wherein the data repository comprises a distributed repository stored on computing systems;
    obtain accommodation data from each host computing system of the plurality of host computing systems, wherein the accommodation data comprises host computing system attributes and data access attributes for each of the host computing systems, wherein the data access attributes are related to an accessibility of the data repository by each of the plurality of host computing systems, and wherein the data access attributes comprise at least bandwidth availability information for accessing the data repository by each of the plurality of host computing systems;
    determine accommodation scores for each of the plurality of host computing systems based on the accommodation data;
    identify a host computing system in the plurality of host computing systems for the job process based on the accommodation scores; and
    communicate a command to initiate a virtual node on the identified host computing system
    executing, by the initiated virtual node, the job process by retrieving data from the data repository.

18. The system of claim 17 wherein processing instructions to obtain the accommodation data for the plurality of host computing systems direct the processing system to:
    transfer, to the plurality of host computing systems, a request for at least a portion of the accommodation data;
    receive, from the plurality of host computing systems, at least the portion of the accommodation data.

19. The system of claim 17 the host computing system attributes comprise at least one of cache memory availability, processing availability, or backplane characteristics.

20. The system of claim 17 wherein the processing instructions further direct the processing system to determine accommodation scores for the plurality of host computing systems based on the accommodation data, and wherein the processing instructions to identify the host computing system in the plurality of host computing systems for the job process based on the accommodation data direct the processing system to identify the host computing system in the plurality of host computing systems for the job process based on the accommodation scores.

* * * * *